No. 757,506.

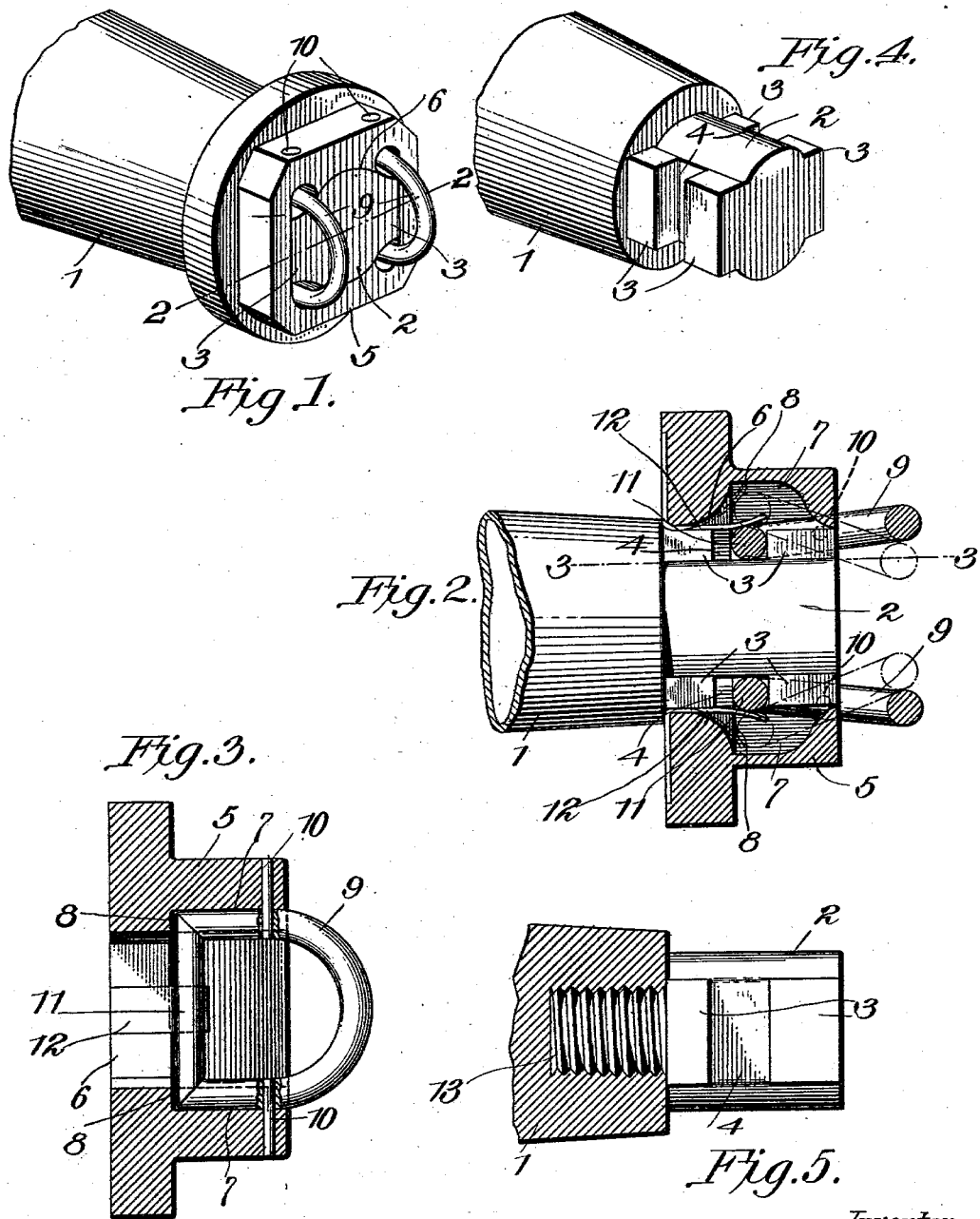

Patented April 19, 1904.

UNITED STATES PATENT OFFICE.

CHARLES SCHNEIDER, SR., OF NEW COMERSTOWN, OHIO.

AXLE-NUT.

SPECIFICATION forming part of Letters Patent No. 757,506, dated April 19, 1904.

Application filed July 7, 1903. Serial No. 164,589. (No model.)

*To all whom it may concern:*

Be it known that I, CHARLES SCHNEIDER, Sr., a citizen of the United States, residing at New Comerstown, in the county of Tuscarawas and State of Ohio, have invented a new and useful Axle-Nut, of which the following is a specification.

My invention relates to axle-nuts, and has for its objects to produce a device of this character of comparatively simple construction which may be readily applied to or removed from the axle, one in which the locking members which engage the axle will be housed within the nut, and one in which the pivotal devices of the locking members will be relieved of the strain due to pressure of wheel upon the nut when in operation.

In the accompanying drawings, Figure 1 is a perspective view illustrating the nut applied. Fig. 2 is a horizontal sectional plan taken on the line 2 2 of Fig. 1. Fig. 3 is a section on the line 3 3 of Fig. 2. Fig. 4 is a perspective view of the end of the spindle with the nut removed. Fig. 5 is a sectional elevation of a modification.

Referring to the drawings, 1 indicates an axle-spindle of any suitable material and of any desired construction, except that in accordance with my invention it is provided at its outer end with a reduced extension 2, having upon diametrically opposite sides laterally-extending horizontal lugs 3, arranged in pairs and spaced in a direction longitudinally of the extension to form recesses 4, the purpose of which will hereinafter appear.

5 is a nut which seats upon the extension 2 and is provided with a central opening 6 for the reception of the latter, the nut being designed to take up the end thrust of a wheel-hub working upon the spindle, as usual. The interior of the nut is cored out at the sides of the opening 6, as at 7 7, forming cavities which are disposed opposite the recesses 4 between the lugs 3, the formation of said cavaties, which do not extend through the entire length of the nut, serving to produce inner walls or abutments 8 8, the purpose of which will presently appear.

9 indicates a pair of locking members partially housed within the nut and pivoted upon pins or axes 10 to swing at right angles to the longitudinal axis of the spindle and into the cavities 7, as indicated by dotted lines in Fig. 2. These members normally extend substantially parallel with the longitudinal axis of the spindle and engage within the recesses 4 between the lugs 3, whereby the nut is securely locked to the spindle and may be readily removed therefrom by swinging the members out of engagement with the lugs, as more fully hereinafter described. The members, which are preferably of the form herein shown, comprising a U-shaped portion, the crown of which extends beyond the outer face of the nut and the side arms of which are connected by a cross-bar 11, which normally engages the lugs, are maintained in engagement with the lugs each by a leaf-spring 12, attached in any suitable manner to the nut and adapted to bear upon the inner face of the bar 11 for pressing the latter to engaging position, as illustrated by full lines in Fig. 2.

In operation when the parts are engaged, as in Fig. 2, the springs 12 will, as before stated, press the locking members into engagement with the lugs 3, thus preventing escape of the nut, and under such conditions the shocks sustained by the nuts, owing to end thrust of the wheel-hub, will, owing to the cross-bar 11 of the members bearing at its ends upon the walls or abutments 8 of the nut, be borne entirely by the member and the pivotal pins 10 be entirely free from strain. If it is desired to remove the nut, the operator grasps the outer extending portions of the members and compresses them toward each other, whereby they will swing on their pivots to the dotted position in Fig. 2, thus forcing the springs 12 inward and moving the cross-bars 11 out of engagement with the lugs, whereby the nut may be freely withdrawn, as will be readily understood.

While I prefer to make the extension 2 an integral part of the spindle, as illustrated in Figs. 2 and 4, it is to be understood that the same may be made a separate part, as illustrated in Fig. 5, and attached to the spindle by means of a threaded cylindrical stem 13, tapped into an internally-threaded opening formed centrally and longitudinally of the spindle.

From the foregoing it will be seen that I produce a device of simple construction which will be strong and durable, one which in practice will present a neat appearance and which may be readily applied to or removed from the spindle. It is to be particularly noted in this connection that the nut may be applied to either end of the axle, or, in other words, that the selecting of the nut to agree with the particular spindle to which it is to be applied, as is necessary in the devices now in use, is entirely obviated.

While I believe the device herein illustrated to be the best adapted for the attainment of the particular ends in view, it is to be understood that I do not limit myself to the structural details herein set forth, inasmuch as minor changes may be made therein without departing from the spirit of the invention.

Having thus described my invention, what I claim is—

1. The combination with a spindle having lugs associated therewith, of a hollow nut applied to the spindle and having inner cavities forming a wall or abutment, locking members pivoted and inclosed within the nut and operable for engagement with said lugs, said members normally bearing upon the wall or abutment, and means for holding the members to engaging position.

2. The combination with an axle-spindle having lugs associated therewith, of a hollow nut applied to the spindle and having inner cavities forming a wall or abutment, locking members pivoted and inclosed within the nut and having cross-bars for engagement with the lugs, said cross-bars normally bearing upon the wall or abutment, and leaf-springs attached to the nut and bearing upon the inner faces of the cross-bars to maintain them in engaging position.

In testimony that I claim the foregoing as my own I have hereto affixed my signature in the presence of two witnesses.

CHARLES SCHNEIDER, Sr.

Witnesses:
J. H. JOCHUM, Jr.,
J. ROSS COLHOUN.